March 13, 1962 A. R. SCHILLING ET AL 3,025,359
VIBRATION-COMPENSATED PRESSURE SENSITIVE MICROPHONE
Filed Feb. 25, 1960

INVENTORS
ARTHUR R. SCHILLING
HERMAN W. ERICHSEN
BY
Cyrus D. Samuelson
ATTORNEY

United States Patent Office 3,025,359

Patented Mar. 13, 1962

3,025,359

VIBRATION-COMPENSATED PRESSURE SENSITIVE MICROPHONE

Arthur R. Schilling, North Plainfield, and Herman W. Erichsen, Nixon, N.J., assignors to Gulton Industries, Inc., Metuchen, N.J., a corporation of New Jersey Filed Feb. 25, 1960, Ser. No. 10,959
6 Claims. (Cl. 179—110)

Figure 1:
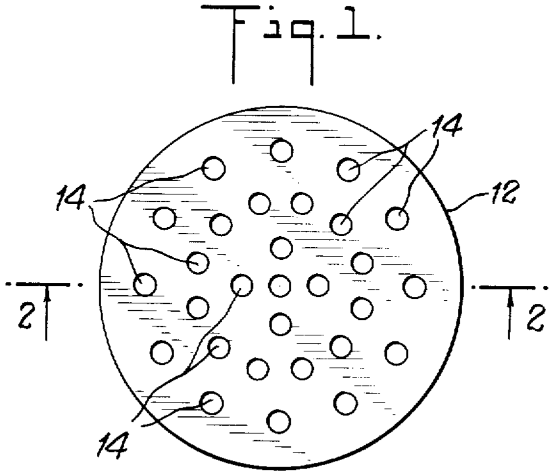

Our invention relates to pressure sensitive microphones and in particular to such microphones which employ a piezoelectric ceramic as the active element and in which the output of the device is substantially free of any component due to acceleration.

It has long been known that piezoelectric ceramic elements may be used in microphones which are employed for sound measurement. While the employment of such microphones for the purpose has been well established, there have been certain inherent characteristics which have acted as deterrents to their use. These microphones are usually acceleration sensitive and are insensitive at the lower sound levels (low sensitivity). A device is considered to be acceleration sensitive when it provides an electrical output as a result of being subjected to a shock or a vibration.

In order to increase the sensitivity of a piezoelectric ceramic microphone, we have mounted it on a center-supported plate so that the combination is flexed in accordance with the sound pressure applied to the ceramic element. Such a device has been described in Patent 2,808,522 to Abraham I. Dranetz for Accelerometer. It should be noted that this patent is directed toward providing an improved accelerometer having increased sensitivity. Among other things, we have reduced the acceleration response by reducing the mass at the periphery of the "mushroom." While we have taken all the precautions that can be taken to reduce the device's acceleration response while maintaining the advantage of improved sensitivity, the microphone still possesses considerable response to acceleration.

Due to the fact that there is an undesirable amount of acceleration response still present, we have provided means for balancing out these effects. This is accomplished by mounting a second mushroom element, having substantially the same mechanical and electrical characteristics as the first mushroom element, in the same housing as the microphone element such that both elements are subjected to the same acceleration. However, the electrical outputs of the two elements must be connected so that they are out of phase and the voltages generated due to the acceleration cancel out so that they do not appear in the output.

This cancellation may be accomplished by mounting the two piezoelectric ceramic elements back to back, connecting them in parallel, and polarizing them in the same direction or by mounting them back to face, connecting them in parallel and polarizing them in opposite directions. It is essential that the piezoelectric ceramic elements be connected so that their electrical outputs due to acceleration are out of phase.

Accordingly, it is an important object of our invention to provide a sensitive microphone whose output is essentially free of any component due to acceleration.

It is a further object of our invention to provide such a microphone having a pair of piezoelectric ceramic elements, only one of which is subject to the acoustic wave from the acoustic medium in which the microphone is used.

It is a still further object of our invention to provide such a microphone in which the piezoelectric ceramic elements are mounted back to back, connected in parallel and polarized in the same direction.

Figures 2, 3:
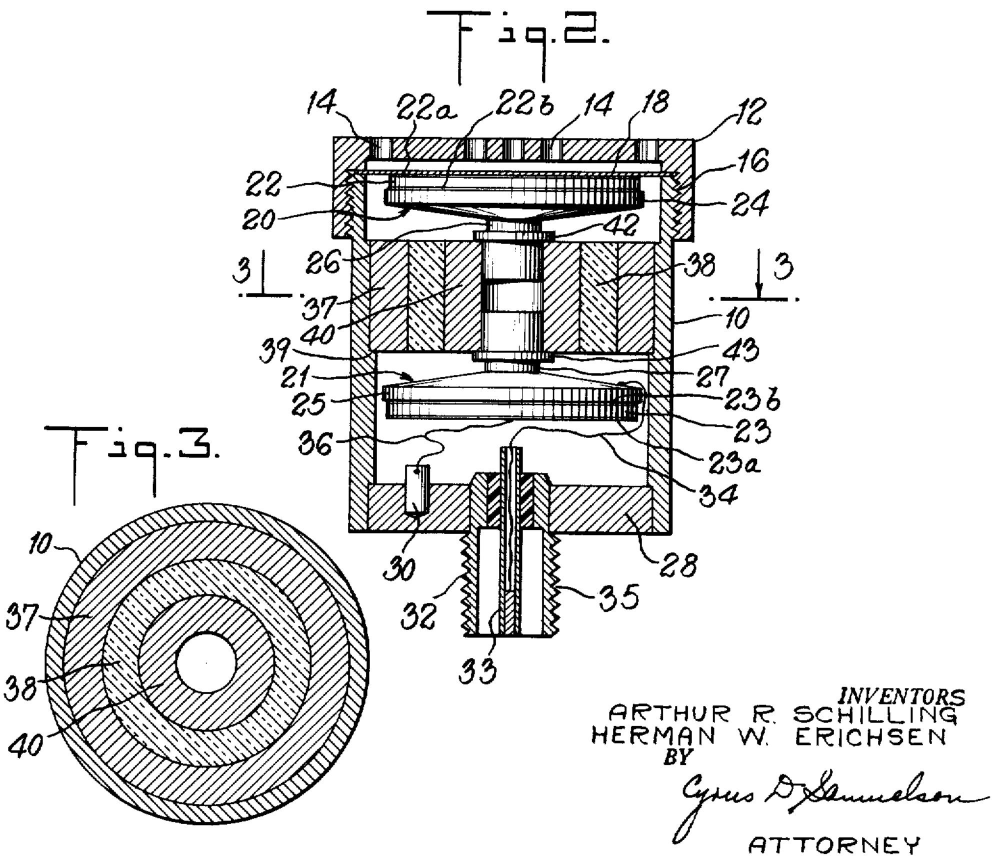

These and other objects, features, uses and advantages will be apparent during the course of the following description when taken in conjunction with the accompanying drawings wherein:

FIGURE 1 is a horizontal plan view of a preferred embodiment of microphone of our invention, FIGURE 2 is a cross-sectional view along the line 2—2 of FIGURE 1, and FIGURE 3 is a cross-sectional view along the line 3—3 of FIGURE 2.

In the figures wherein, for the purpose of illustration, is shown a preferred embodiment of our invention, the numeral 10 designates the housing of a microphone of our invention. Cap 12, which carries a plurality of holes 14, is threaded to housing 10 at 16. Housing 10 and cap 12 are preferably formed of steel, titanium or similar material. Diaphragm 18 of aluminum or similar thin flexible material is held in place by being clamped around its periphery between cap 12 and housing 10. Microphone 20 is a piezoelectric ceramic transducer and comprises disk-shaped piezoelectric ceramic element 22 having electrodes 22*a* and 22*b* applied thereto in the manner well-known in the art, piezoelectrically inert disk-shaped element 24 and stem 26. Stem 26 is flanged as at 42, the purpose of which will be discussed below.

Accelerometer 21 is a piezoelectric ceramic transducer and comprises disk-shaped piezoelectric ceramic element 23 having electrodes 23*a* and 23*b* applied thereto in the manner well-known in the art, piezoelectrically inert disk-shaped element 25 and stem 27. Stem 27 is flanged at 43 in a manner similar to stem 26. Housing 10 is closed by means of end cap 28 of steel, titanium or similar material which is force fitted into the housing. Connector 32 which comprises center pin 33 and shell 35 is fitted in end cap 28. Stud 30 is likewise fitted in end cap 28. Electrical connection is made between end cap 28 and shell 35 of connector 32 and between end cap 28 and stud 30.

Cylindrical mounting element 37 is formed of steel or similar material, cylindrical mounting element 38 is formed of molded Mycalex insulating material and cylindrical mounting element 40 is formed of steel or similar material. Electrical lead 34 is connected between inert element 25 and center pin 33 and electrical lead 36 is connected between face electrode 23*a* and stud 30.

Electrically, face electrodes 22*a* is connected to the housing through diaphragm 18 and face electrode 23*a* is connected to the housing through lead 36 and stud 30. Consequently, they are connected to shell 35 of connector 32 through end cap 28. Electrode 22*b* is in contact with element 24 and through it is electrically connected to stem 26. Similarly, electrode 23*b* is electrically connected to stem 27. Stems 26 and 27 are in intimate contact with mounting element 40 so that they are connected together electrically. Lead 34 connects this group to center pin 33 of connector 32. Thus it can be seen that the two piezoelectric ceramic transducers are connected in parallel.

Since they are mounted with their stems as close as possible and their faces as far away from each other as possible (back to back) and since they are elecrtically connected as described, elements 22 and 23 are polarized in the same direction. If the transducers are mounted in some other configuration or if they are electrically connected other than as shown or described, it may be necessary to polarize the active elements in opposite directions. The criterions for polarization, electrical connection and mounting are that they shall be such that when the electrical outputs of the two transducers are combined they shall be out of phase for a given mechanical acceleration applied to the unit.

Microphones of our invention are assembled as follows: connector 32 and stud 30 are affixed to end cap 28 and the combination is force fitted into housing 10. Transducers 20 and 21 are assembled, and leads 34 and 36 are connected to element 25 and face electrode 23*a*. Mounting elements 37, 38 and 40 are molded together and stems 26 and 27 are pushed into the opening provided until flanges 42 and 43 are in solid contact with element 40 and the combination is firmly together. Now, polarizing voltage is applied to leads 34 and 36 thereby polarizing both active piezoelectric ceramic elements. The mounting elements and both transducers are placed on a test jig such as a split-ring clamp in order to measure the transverse sensitivity of the combination. Transducer 21 is rotated until the transverse sensitivity is a minimum.

Next, the transducer assembly is placed in the housing so that leads 34 and 36 can be soldered to center pin 33 and stud 30, respectively. The transducer assembly is now pushed in place so that it rests on ledge 39 of housing 10. Diaphragm 18 is placed on top of the assembly and cap 12 is tightly threaded to housing 10.

In operation, acoustic waves from the acoustic medium in which the microphone is placed, impinge on element 22 but element 23 is isolated from the acoustic waves. Both transducers will be subjected equally to any mechanical acceleration but since the outputs are out of phase, the electrical output of the combination will only be that due to the acoustic waves which impinge on the diaphragm. The two transducers need not be identical or even similar in structure so long as they have equal outputs for a given applied acceleration.

While the active elements of the transducers used in microphones of our invention are preferably formed of polarized ferroelectric ceramic such as barium titanate, lead titanate-zirconate or other similar materials with or without additives, other material such as magnetostrictives, natural or artificial piezoelectrics may also be used as the active elements in microphones of our invention.

While we have disclosed our invention in relation to a specific example and in a specific embodiment, we do not wish to be limited thereto, for obvious modifications will occur to those skilled in the art without departing from the spirit and scope of our invention.

Having thus described our invention, we claim:

1. A microphone for use in an acoustic medium comprising a housing; a pair of piezoelectric ceramic transducers; each of said pair of piezoelectric ceramic transducers comprising a disk-shaped active element, a disk-shaped piezoelectrically inert element, a stem, said disk-shaped active element being mounted on said disk-shaped piezoelectrically inert element, said disk-shaped piezoelectrically inert element being mounted on said stem and said stem being substantially in the center of said disk-shaped piezoelectrically inert element, electrodes applied to each surface of said disk-shaped active element and means for making electrical connections to said electrodes; said piezoelectric ceramic transducers being polarized in the same direction; said piezoelectric ceramic transducers being mounted within said housing such that the stems thereof are closest together and the faces of the disk-shaped active elements thereof are furthest removed from each other; means in said housing for permitting acoustic waves from said acoustic medium to impinge on the face of one of said pair of piezoelectric ceramic transducers; means in said housing for isolating acoustic waves from said acoustic medium from the face of the other of said pair of piezoelectric ceramic transducers; the electrodes on the faces of both of said piezoelectric ceramic transducers being connected together electrically; and the electrodes on the surfaces of said disk-shaped active elements in contact with said piezoelectrically inert disks being connected together.

2. A microphone for use in an acoustic medium comprising a housing, a first piezoelectric transducer in said housing, means in said housing for permitting acoustic waves from said acoustic medium to impinge on said first piezoelectric transducer, a second piezoelectric transducer in said housing and isolated from the acoustic waves from said acoustic medium, electrodes on said first transducer and on said second transducer, common support means in said housing connected to said first and second transducers over limited areas thereof wherein the portions of the transducers remote from said support means may vibrate freely when mechanical vibrating forces are applied thereto, means for making electrical connections to said electrodes on said first transducer and to said electrodes on said second transducer, and means interconnecting the electrical connections of said electrodes for providing a resultant output wherein the acceleration response signal components thereof are in phase opposition.

3. A microphone for use in an acoustic medium comprising a housing, a pair of piezoelectric transducers having similar characteristics, common support means for said transducers connected to limited areas thereof, the portions of said transducers remote from said common support means being free to vibrate under application of mechanical vibrating forces, means enabling acoustic waves from said acoustic medium to vibrate one of said transducers, means for isolating the other of said transducers from the acoustic waves in said acoustic medium, and means interconnecting the electrical outputs of said transducers to provide a resultant output wherein the acceleration response signal components thereof are in phase opposition.

4. The microphone of claim 3 wherein said piezoelectric transducers are disk-shaped elements, and said support means supporting said disk-shaped elements on opposite sides thereof in parallel relationship.

5. The microphone of claim 3 wherein said support means engages said transducers only at the central portions thereof.

6. A microphone for use in an acoustic medium comprising a housing, a pair of piezoelectric transducers, each of said piezoelectric transducers comprising a disk-shaped active element, a stem, said disk-shaped active element being mounted on said stem with said stem being opposite the center of said disk-shaped element, electrodes applied to each surface of said disk-shaped active element and means for making electrical connections to said electrodes, said piezoelectric transducers being polarized in the same direction, said piezoelectric transducers being mounted within said housing where the stems thereof are closest together and the faces of the disk-shaped active elements thereof are furthest removed from each other, means in said housing for permitting acoustic waves from said acoustic medium to vibrate one of said pair of piezoelectric transducers, means in said housing for isolating acoustic waves from said acoustic medium from the other of said pair of piezoelectric transducers; the electrodes on the faces of both of said piezoelectric transducers being connected together electrically, and the electrodes on the surfaces of said piezoelectric transducers being connected together.

References Cited in the file of this patent

UNITED STATES PATENTS

| | | |
|---|---|---|
| 2,242,757 | Romanow | May 20, 1941 |
| 2,406,119 | Williams | Aug. 20, 1946 |
| 2,835,735 | Moen | May 20, 1958 |